United States Patent
Yang et al.

(10) Patent No.: US 12,445,758 B2
(45) Date of Patent: Oct. 14, 2025

(54) WEARABLE DEVICE AND ACOUSTIC MODULE WATERPROOF PROTECTION MECHANISM THEREOF

(71) Applicant: GOERTEK INC., Shandong (CN)

(72) Inventors: Qing Yang, Shandong (CN); Jianjian Sui, Shandong (CN)

(73) Assignee: GOERTEK INC., Weifang (CN)

( * ) Notice: Subject to any disclaimer, the term of this patent is extended or adjusted under 35 U.S.C. 154(b) by 224 days.

(21) Appl. No.: 18/256,477

(22) PCT Filed: Aug. 25, 2021

(86) PCT No.: PCT/CN2021/114446
§ 371 (c)(1),
(2) Date: Jun. 8, 2023

(87) PCT Pub. No.: WO2022/121378
PCT Pub. Date: Jun. 16, 2022

(65) Prior Publication Data
US 2024/0107212 A1    Mar. 28, 2024

(30) Foreign Application Priority Data
Dec. 8, 2020   (CN) .......................... 202011423857.6

(51) Int. Cl.
*G04G 17/02* (2006.01)
*G04B 23/00* (2006.01)
(Continued)

(52) U.S. Cl.
CPC .......... *H04R 1/028* (2013.01); *G04B 37/081* (2013.01); *H04R 1/023* (2013.01); *H04R 1/086* (2013.01); *H04R 2499/11* (2013.01)

(58) Field of Classification Search
CPC ........ G04G 17/00; G04G 17/02; G04G 17/04; G04G 17/08; G04G 21/06; G04G 99/00;
(Continued)

(56) References Cited

U.S. PATENT DOCUMENTS 3,987,258 A * 10/1976 Tsutsui ................. H05K 5/0213
181/149
6,975,740 B2 * 12/2005 Rautio .................... H04M 1/03
381/189
(Continued)

FOREIGN PATENT DOCUMENTS

CN    107864436 A    3/2018
CN    109901378 A    6/2019
(Continued)

OTHER PUBLICATIONS

International Search Report from International Application No. PCT/CN2021/114446 mailed Nov. 26, 2021.

*Primary Examiner* — Edgardo San Martin
(74) *Attorney, Agent, or Firm* — Shih IP Law Group, PLLC

(57) ABSTRACT

The present invention discloses an acoustic module waterproof protection mechanism, including an acoustic module arranged in a housing, an acoustic port provided on an outer wall of the housing and communicating with the acoustic module, a waterproof sound-permeable membrane arranged on an inner wall of the housing and covering the acoustic port, the an acoustic module waterproof protection mechanism further includes a waterproof valve assembly embedded in a hole wall of the acoustic port in a stretchable manner, which is used to stretch into the acoustic port to block the acoustic port when an external water pressure is greater than an air pressure in the housing.

9 Claims, 3 Drawing Sheets

(51) Int. Cl.
  *G04B 37/08* (2006.01)
  *H04R 1/02* (2006.01)
  *H04R 1/08* (2006.01)
  *H04R 1/44* (2006.01)

(58) Field of Classification Search
  CPC ........ H04M 1/18; H04M 1/03; H04B 1/3827; H04B 1/385; H04B 2001/3894; H04R 1/02; H04R 1/028; H04R 1/023; H04R 1/086; H04R 1/44; H04R 2201/02; H04R 2499/11; F16K 15/063; G04B 37/081; G04B 37/08; G04B 23/00
  See application file for complete search history.

(56) References Cited

U.S. PATENT DOCUMENTS

| | | | |
|---|---|---|---|
| 9,357,299 B2 * | 5/2016 | Kwong | H04R 3/007 |
| 9,380,369 B2 * | 6/2016 | Utterman | H04R 1/086 |
| 9,625,944 B2 * | 4/2017 | Weber | H04M 1/18 |
| 10,036,478 B2 * | 7/2018 | Katsuda | F16K 99/0015 |
| 10,310,567 B2 * | 6/2019 | Kita | H04R 1/02 |
| 10,601,970 B2 * | 3/2020 | Gilmore | H04R 1/086 |
| 10,698,367 B2 * | 6/2020 | Park | H04R 1/44 |
| 11,463,803 B2 * | 10/2022 | Wilmink | H04R 1/1083 |
| 2017/0002939 A1 | 1/2017 | Katsuda et al. | |

FOREIGN PATENT DOCUMENTS

| | | |
|---|---|---|
| CN | 209897217 U | 1/2020 |
| CN | 111093136 A | 5/2020 |
| CN | 111279806 A | 6/2020 |
| CN | 111615023 A | 9/2020 |
| CN | 112511929 A | 3/2021 |
| JP | 2001128272 A | 5/2001 |
| JP | 2011217286 A | 10/2011 |
| WO | 2011114188 A1 | 9/2011 |

* cited by examiner

WEARABLE DEVICE AND ACOUSTIC MODULE WATERPROOF PROTECTION MECHANISM THEREOF

The present application claims the priority of the Chinese Patent Application No. 202011423857.6, titled "WEARABLE DEVICE AND ACOUSTIC MODULE WATERPROOF PROTECTION MECHANISM THEREOF" filed to China Patent Office on Dec. 8, 2020, the entire contents of which are incorporated herein by reference.

TECHNICAL FIELD

The present invention relates to the technical field of wearable devices, in particular to an acoustic module waterproof protection mechanism. The invention also relates to a wearable device.

DESCRIPTION OF RELATED ART

With the development of electronic technology in China, more and more electronic devices have been widely used.

For wearable devices with acoustic functions, such as sound transmitting sound and receiving sound, especially, smart wearable products with high waterproof level, such as smart watches, bracelets, etc., wherein it is especially important that the acoustic modules, such as microphones or loudspeakers, have a sealed structure design. Most smart watches on the market require high-level waterproof. The primary waterproof components are microphones and loudspeakers. The waterproof of the two components mainly relies on waterproof sound-permeable membranes and adhesive sealing. The sealing performance determines whether the whole wearable device can meet high-level waterproof requirements, for example water cannot enter within the predetermined time at 50 meters underwater.

In prior art, the waterproof sound-permeable membrane of the acoustic module is usually mounted on the module chip, the module chip communicates with the outside through the acoustic port, and the waterproof sound-permeable membrane can block liquid from entering the housing through the acoustic port, while allowing the sound to enter the housing through the acoustic port or be transmitted to the outside of the housing through the acoustic port. However, the pressure resistance performance of the waterproof sound-permeable membrane is limited. Although the waterproof sound-permeable membrane may effectively bear the water pressure within a certain depth of water and prevent external liquids from entering the housing, it is easy for the waterproof sound-permeable membrane enters into a state of accelerated damage and fatigue until fracture or complete failure when it is exposed to deep water and high pressure environment for a long time.

Therefore, how to prevent the waterproof sound-permeable membrane from bearing water pressure for a long time under water, delay the damage of the waterproof sound-permeable membrane, and prolong the service life of the waterproof sound-permeable membrane is a technical problem faced by those skilled in the art.

SUMMARY

A purpose of the present invention is to provide an acoustic module waterproof protection mechanism, which can prevent the waterproof sound-permeable membrane from bearing water pressure for a long time under water, delay the damage of the waterproof sound-permeable membrane, and prolong the service life of the waterproof sound-permeable membrane. Another object of the present invention is to provide a wearable device.

In order to solve the above problems, the present invention provides an acoustic module waterproof protection mechanism, comprising an acoustic module provided in a housing, an acoustic port provided on an outer wall of the housing and communicated with the acoustic module; and a waterproof sound-permeable membrane provided on an inner wall of the housing and covering the acoustic port, the acoustic module waterproof protection mechanism further includes a waterproof valve assembly embedded in a hole wall of the acoustic port in a stretchable manner, the waterproof valve assembly is used to stretch into the acoustic port to block the acoustic port when an external water pressure is greater than an air pressure in the housing.

Preferably, the waterproof valve assembly comprises a valve cavity provided in the hole wall of the acoustic port, a piston rod provided in the valve cavity in a stretchable manner, and a rod cavity of the valve cavity communicates with an inside of the housing, and a rod-less cavity of the valve cavity communicates with an outside of the housing.

Preferably, a resetting spring is sleeved on a rod end of the piston rod, and one end of the resetting spring abuts on an inner wall of the valve chamber, and the other end of the resetting spring abuts on an inner end surface of a head end of the piston rod.

Preferably, a sealing ring is sleeved on an outer edge surface of a head end of the piston rod to seal a gap between the outer edge surface of the head end of the piston rod and an inner wall of the valve cavity.

Preferably, an end cross-sectional shape of the rod end of the piston rod is the same as a cross-sectional shape of the acoustic port.

Preferably, the rod end of the piston rod has elasticity.

Preferably, a hole wall of the acoustic port is a smooth surface.

Preferably, an inner wall of the valve cavity is a smooth surface.

Preferably, the waterproof valve assembly further comprises an air passage hole provided on an inner wall of the housing and extending to the rod cavity of the valve cavity to be communicated with the rod cavity of the valve cavity, and a liquid passage hole provided on an outer wall of the housing and extending to the rod-less cavity of the valve cavity to be communicated with the rod-less cavity of the valve cavity, and a position where the air passage hole and the valve cavity are communicated is located within a region covered by a stroke of the piston rod.

The present invention further provides a wearable device comprising a housing and an acoustic module waterproof protection mechanism arranged in the housing, wherein the acoustic module waterproof protection mechanism is the acoustic module waterproof protection mechanism according to any one of the above described.

The acoustic module waterproof protection mechanism provided by the present invention mainly includes an acoustic module, an acoustic port, a waterproof sound-permeable membrane and a waterproof valve assembly. Wherein, the acoustic module is arranged in the housing, and the acoustic port is provided on the outer wall of the housing and extends into the housing to communicate with the acoustic module, so that the acoustic module receives sound signal transmitted from the outside through the acoustic port, to realize the sound receiving, or so that the acoustic module transmit sound signal to the outside through the acoustic port, to realize the sound transmitting. The waterproof sound-permeable membrane is arranged on the inner wall of the housing and covers a surface of the orifice of the acoustic port, the waterproof sound-permeable membrane is mainly used to isolate the inside and outside of the housing and prevent liquid from entering the housing through the acoustic port, while allowing sound enters the housing through the acoustic port or transmits to the outside of the housing through the acoustic port. The waterproof valve assembly is entirely embedded in the hole wall at the acoustic port in the outer wall of the housing, and is mainly used to bear the external water pressure outside the housing and the internal air pressure in the housing at the same time (the housing is a sealed structure), and when the external water pressure is greater than the internal air pressure in an underwater environment, the waterproof valve assembly stretches into the acoustic port from the hole wall of the acoustic port, and completely block the acoustic port to isolate the inside and outside of the acoustic port, thereby preventing the external water pressure outside the acoustic port from continuing to apply on the waterproof sound-permeable membrane inside the acoustic port, to protect the waterproof sound-permeable membrane. Therefore, the acoustic module waterproof protection mechanism provided by the present invention can effectively form a water pressure protection for the waterproof sound-permeable membrane, prevent the waterproof sound-permeable membrane from bearing water pressure for a long time under water, delay the damage of the waterproof sound-permeable membrane, and prolong the service life of the waterproof sound-permeable membrane by blocking the acoustic port underwater by the waterproof valve assembly.

BRIEF DESCRIPTION OF DRAWINGS

In order to explain the embodiments of the present invention or the technical solutions in the prior art more clearly, the following will briefly introduce the drawings that need to be used in the description of the embodiments or the prior art. Obviously, the drawings in the following description are only an embodiment of the present invention. For those of ordinary skill in the art, other drawings may be obtained according to the provided drawings without creative work.

Among them, in FIGS. 1 to 4:

housing—1, acoustic module—2, acoustic port—3, waterproof acoustic-permeable membrane—4, waterproof valve assembly—5, sealing ring—6;

valve cavity—51, piston rod—52, resetting spring—53, air passage hole—54, liquid passage hole—55; rod end—521, head end—522.

DETAILED DESCRIPTIONS

The technical solutions in the embodiments of the present invention will be clearly and completely described below in conjunction with the accompanying drawings in the embodiments of the present invention. Obviously, the described embodiments are only a part of the embodiments of the present invention, but not all the embodiments. Based on the embodiments of the present invention, all other embodiments obtained by those of ordinary skill in the art without creative work shall fall within the scope of the present invention.

Figure 1:
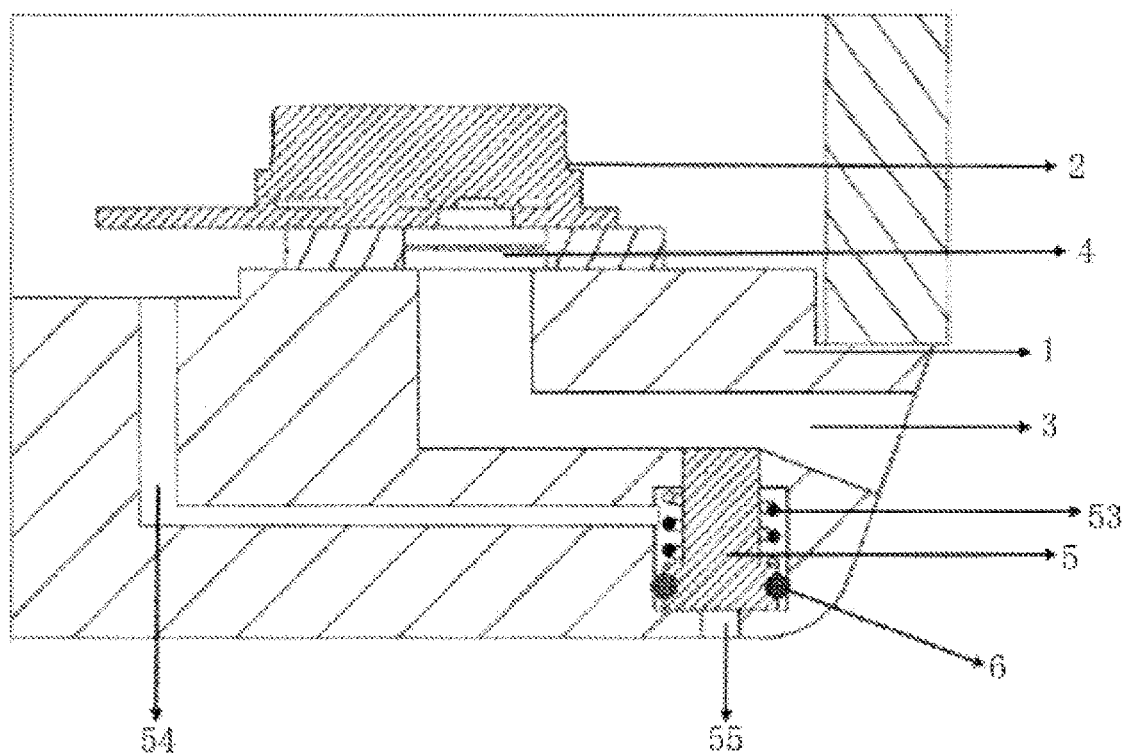
FIG. 1 is a schematic diagram of a state in which an acoustic port is not blocked by a waterproof valve assembly in a specific embodiment provided by the present invention.
Figure 2:
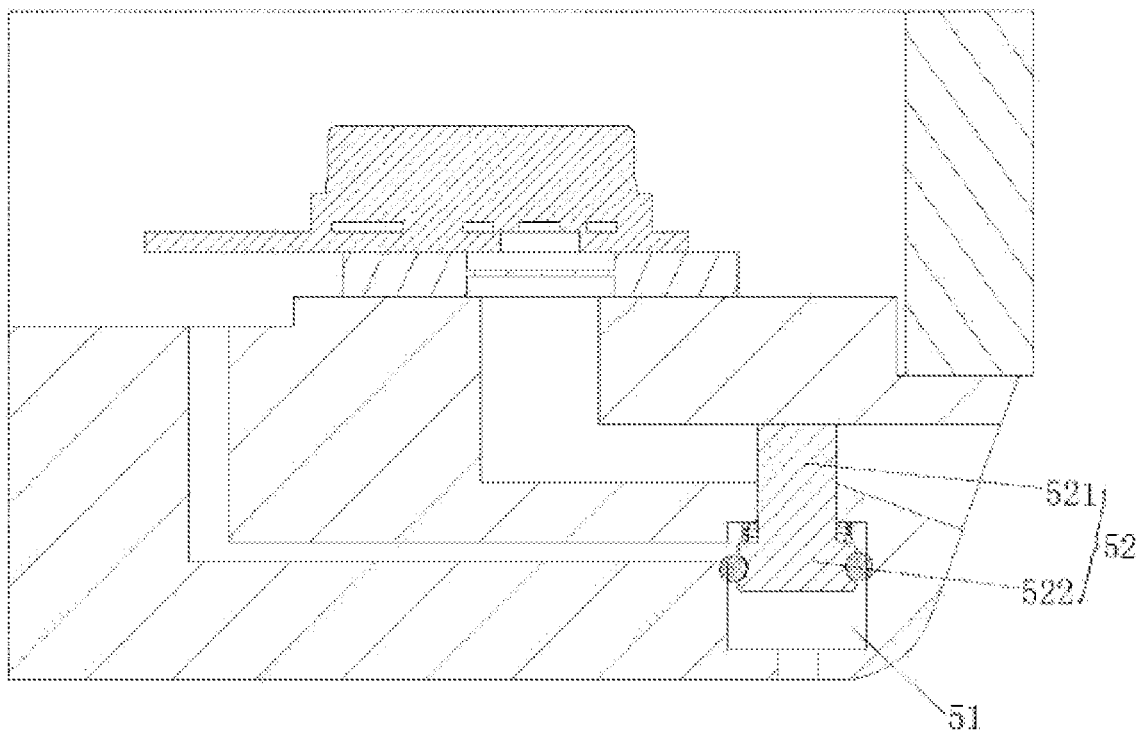
FIG. 2 is a schematic diagram of a state in which acoustic port is blocked by the waterproof valve assembly in a specific embodiment provided by the present invention.

Referring to FIGS. 1 and 2, FIG. 1 is a schematic diagram of a state in which the acoustic port 3 is not block by the waterproof valve assembly 5 in a specific embodiment provided by the present invention, and FIG. 2 is a schematic diagram of a state in which the acoustic port 3 is blocked by the waterproof valve assembly 5 in a specific embodiment provided by the present invention.

In a specific embodiment provided by the present invention, the acoustic module waterproof protection mechanism mainly includes an acoustic module 2, an acoustic port 3, a waterproof sound-permeable membrane 4 and a waterproof valve assembly 5.

Wherein, the acoustic module 2 is arranged in the housing 1, and the acoustic port 3 is provided on the outer wall of the housing 1 and extends into the housing 1 to communicate with the acoustic module 2, so that the acoustic module 2 receives sound signal transmitted from the outside through the acoustic port 3, to realize the sound receiving, or so that the acoustic module 2 transmit sound signal to the outside through the acoustic port 3, to realize the sound transmitting.

The waterproof sound-permeable membrane 4 is arranged on the inner wall of the housing 1 and covers a surface of the orifice of the acoustic port 3, mainly used to isolate the inside and outside of the housing 1 and prevent liquid from entering the housing 1 through the acoustic port 3, while allowing sound enters the housing 1 through the acoustic port 3 or transmits to the outside of the housing 1 through the acoustic port 3.

The waterproof valve assembly 5 is entirely embedded in the hole wall at the acoustic port 3 in the outer wall of the housing 1, and is mainly used to bear the external water pressure outside the housing 1 and the internal air pressure inside the housing 1 at the same time (the housing 1 is a sealed structure), and when the external water pressure is greater than the internal air pressure in an underwater environment, the waterproof valve assembly stretches into the acoustic port 3 from the hole wall of the acoustic port 3, and completely block the acoustic port 3 to isolate the inside and outside of the acoustic port 3, thereby preventing the external water pressure outside the acoustic port 3 from continuing to apply on the waterproof sound-permeable membrane 4 inside the acoustic port 3, to protect the waterproof sound-permeable membrane 4.

Therefore, the acoustic module waterproof protection mechanism provided by the present embodiment can effectively form a water pressure protection for the waterproof sound-permeable membrane 4, prevent the membrane 4 from bearing water pressure underwater for a long time, delay the damage of the waterproof sound-permeable membrane 4, and prolong the service life of the waterproof sound-permeable membrane 4 by blocking the acoustic port 3 underwater by the waterproof valve assembly 5.

In a preferred embodiment of the waterproof valve assembly 5, the waterproof valve assembly 5 mainly includes a valve cavity 51 and a piston rod 52. Wherein, the valve cavity 51 is specifically provided in the hole wall of the acoustic port 3 in the outer wall of the housing 1, and one end of the valve cavity 51 is in communication with the acoustic port 3. The piston rod 52 is slidably disposed in the valve cavity 51 and may slide along a length direction of the valve cavity 51. When the piston rod 52 stretches out of the valve cavity 51 into the acoustic port 3, the water inlet area of the acoustic port 3 may be reduced, to block the liquid in the acoustic port 3, thereby functioning as a valve. When the piston rod 52 fully stretches out of the valve cavity 51, an end of the piston rod 52 tightly abuts on the inner wall of the acoustic port 3 to completely enclose the acoustic port 3, which is equivalent to the valve being completely closed.

At the same time, in the present embodiment, in order to use the pressure difference between the external water pressure and the internal air pressure as the driving force to drive the piston rod 52 to slide in the valve cavity 51, the rod cavity of the valve cavity 51 communicates with the internal space of the housing 1, and in the meanwhile, the rod-less cavity of the valve cavity 51 communicates with the outside of the housing 1. With the above configurations, since the inside of the housing 1 is filled with gas, the pressure of the rod cavity of the valve cavity 51 is constantly maintained at the air pressure, while the outside of the housing 1 is in an underwater environment, and thus the pressure of the rod-less cavity of the valve cavity 51 remains at the same pressure as that of the water pressure of the current depth. It can be known that when the depth of the underwater environment in which the housing 1 is located exceeds a certain threshold value, the external water pressure will be greater than the internal air pressure, so that the pressure of the rod-less cavity in the valve cavity 51 is greater than the pressure of the rod cavity in the valve cavity 51, thereby generating a pressure difference driving force for the piston rod 52, to drive the piston rod 52 to stretch into the acoustic port 3.

In order to facilitate the rod cavity to communicate with the inside of the housing 1, an air passage hole 54 is provided on the inner wall of the housing 1 in the present embodiment, the air passage hole 54 extends inside an inner wall of the housing 1, and extends until to be communicated with the rod cavity of the valve cavity 51. In the same way, in order to facilitate the rod-less cavity to communicate with the outside of the housing 1, a liquid passage hole 55 is also provided on an outer wall of the housing 1 in the present embodiment. The liquid passage hole 55 extends in the side wall of the housing 1, and extends until to be communicated with the rod-less cavity of the valve cavity 51. Generally, the air passage hole 54 may extend to form an L shape in the side wall of the housing 1, and the liquid passage hole 55 may extend to form a linear shape in the side wall of the housing 1.

In addition, considering that when the piston rod 52 slides in the valve cavity 51, the rod-less cavity and the rod cavity cannot be communicated, i.e., the air passage hole 54 and the liquid passage hole 55 cannot be communicated through the valve cavity 51. For this reason, in the embodiment, the specific position where the air passage hole 54 communicates with the valve cavity 51 is located within the region covered by a stroke of the piston rod 52. Specifically, if the length of the valve cavity 51 is L, the maximum stroke of the piston rod 52 in the valve cavity 51 is generally less than L, which is set to L1, and the position where the air passage hole 54 communicates with the valve cavity 51 must be at a position within the range of L-L1. With the above configurations, even though the piston rod 52 stretches to the maximum stroke in the valve cavity 51, the air passage hole 54 in the wall of the valve cavity 51 will not communicate with the liquid passage hole 55, thereby preventing external liquid from directly flowing into the housing 1 from the valve cavity 51.

In addition, considering that after the piston rod 52 stretches into the acoustic port 3 to block acoustic port 3, the piston rod 52 needs to be retracted into the valve cavity 51 to allow the acoustic port 3 to be communicated after it leaves from the underwater environment. For this reason, a resetting spring 53 is additionally provided in the waterproof valve assembly 5 in the present embodiment. As the name implies, the resetting spring 53 is mainly used to cause the piston rod 52 to perform a resetting movement. Specifically, the resetting spring 53 is sleeved on the rod end (small end) 521 of the piston rod 52, and one end of the resetting spring 53 abuts on the inner wall of the valve chamber 51, and the other end of the resetting spring 53 abuts on the inner end surface of the head end 522 (large end) of the piston rod 52. In a relax state, the piston rod 52 is completely retracted into the valve cavity 51, and the resetting spring 53 is not compressed; while in an underwater environment, the piston rod 52 gradually completely stretch into the acoustic port 3 under the action of the pressure difference, and in this moment, the resetting spring 53 is compressed to a certain extent, and accumulates elastic potential energy; when the housing 1 leaves from the underwater environment, the action of pressure difference disappears, and at this moment, the resetting spring 53 automatically expands under the action of the elastic force, and the piston rod 52 is pushed in opposite direction to be retracted into the valve cavity 51, so that the acoustic port 3 is recommunicated.

In order to prevent the external liquid from flowing into the rod cavity or air passage hole 54 through the gap between the piston rod 52 and the inner wall of the valve cavity 51 after flowing into the rod-less cavity, in the present embodiment, a sealing ring 6 is sleeved on a surface of the outer edge of the head end 522 of the piston rod 52. Specifically, the sealing ring 6 may be embedded on the outer edge of the head end 522 of the piston rod 52, and has elasticity, and can be compressed against the inner wall of the valve cavity 51 by elastic deformation (without affecting the sliding of the piston rod 52), thereby tightly blocking the gap between the piston rod 52 and the inner wall of the valve cavity 51 to prevent water leakage.

Based on the same consideration, in the present embodiment, in order to improve the effect of blocking the acoustic port 3 by the waterproof valve assembly 5, the rod end 521 of the piston rod 52 has elasticity, such as a hard rubber rod. With the above configurations, when the piston rod 52 fully stretch out of the valve cavity 51, an end surface of the rod end 521 of the piston rod 52 tightly abuts on the inner wall of the acoustic port 3, thereby improving the degree of pressing the inner wall of the acoustic port 3 by using the elastic deformation of the rod end 521, to tightly block the gap between the rod end 521 and the inner wall of the acoustic port 3 to prevent water leakage.

Further, in the present embodiment, in order to facilitate the rod end 521 of the piston rod 52 to block the acoustic port 3, the end cross-sectional shape of the rod end 521 of the piston rod 52 is the same as the cross-sectional shape of the acoustic port 3. For example, when the cross-sectional shape of the acoustic port 3 is circular, the cross-sectional shape of the end of the rod end 521 of the piston rod 52 is also circular. Also, in combination with the characteristic that the piston rod 52 has elasticity, the end cross-sectional area of the rod end 521 of the piston rod 52 may be slightly larger than the cross-sectional area of the acoustic port 3 to ensure a complete coverage effect, of course, it is the case that the rod end 521 of the piston rod 52 stretches into the acoustic port 3 vertically and radially.

Furthermore, the hole wall of the acoustic port 3 may also be designed as a smooth surface. With the above configurations, the rod end 521 of the piston rod 52 and the hole wall of the acoustic port 3 contact more tightly to prevent a gap to be formed between the piston rod 52 and the acoustic port 3 due to the irregular structure.

In the same way, in the present embodiment, the inner wall of the valve cavity 51 may also be designed as a smooth surface. With the above configurations, the head end 522 of the piston rod 52 and the inner wall of the valve cavity 51 contact more tightly to prevent a gap to be formed between the piston rod 52 and the valve cavity 51 due to the irregular structure.

Figure 3:
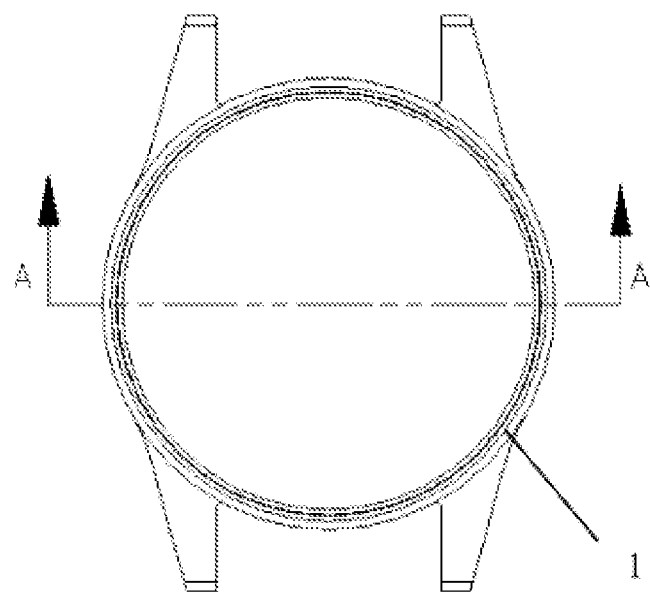
FIG. 3 is a top view of the overall structure of the housing shown in FIG. 1.
Figure 4:
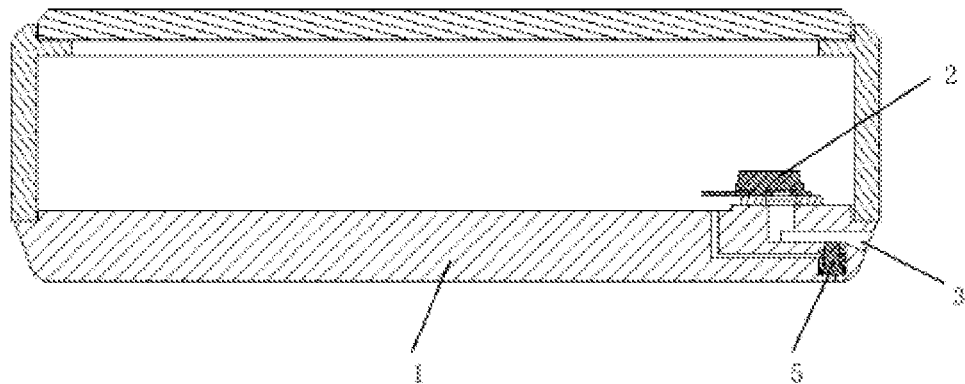
FIG. 4 is a cross-sectional structural diagram of A-A shown in FIG. 3.

As shown in FIGS. 3 and 4, FIG. 3 is a top view of the overall structure of the housing 1 shown in FIG. 1, and FIG. 4 is a cross-sectional structural diagram of A-A shown in FIG. 3

The present embodiment also provides a wearable device, which mainly includes a housing 1 and an acoustic module waterproof protection mechanism disposed in the housing 1, wherein the specific contents of the acoustic module waterproof protection mechanism is the same as the above related contents, and will not be repeated. Specifically, the wearable devices described in the present embodiment mainly refer to watches, bracelets, earphones, etc. In the meanwhile, the acoustic module waterproof protection mechanism is especially suitable for acoustic modules such as microphones and loudspeakers, and of course may also be applied for other types of acoustic components.

The foregoing description of the disclosed embodiments enables those skilled in the art to implement or use the present invention. Various modifications to these embodiments will be obvious to those skilled in the art, and the general principles defined herein may be implemented in other embodiments without departing from the spirit or scope of the present invention. Therefore, the present invention will not be limited to the embodiments illustrated herein, but should be the widest scope consistent with the principles and novel features disclosed herein.

What is claimed is:

1. An acoustic module waterproof protection mechanism, comprising:
    an acoustic module provided in a housing;
    an acoustic port provided on an outer wall of the housing and communicated with the acoustic module; and
    a waterproof sound-permeable membrane provided on an inner wall of the housing and covering the acoustic port,
    wherein the acoustic module waterproof protection mechanism further includes a waterproof valve assembly embedded in a wall of the acoustic port in a stretchable manner, and the waterproof valve assembly is used to stretch into the acoustic port to block the acoustic port when an external water pressure is greater than an air pressure in the housing,
    wherein the waterproof valve assembly comprises a valve cavity provided in the wall of the acoustic port and a piston rod provided in the valve cavity in a stretchable manner, and
    wherein a rod cavity of the valve cavity communicates with an inside of the housing, and a rod-less cavity of the valve cavity communicates with an outside of the housing.

2. The acoustic module waterproof protection mechanism according to claim 1, wherein a resetting spring is sleeved on a rod end of the piston rod, and one end of the resetting spring abuts on an inner wall of the valve chamber, and the other end of the resetting spring abuts on an inner end surface of a head end of the piston rod.

3. The acoustic module waterproof protection mechanism according to claim 1, wherein a sealing ring is sleeved on an outer edge surface of a head end of the piston rod to seal a gap between the outer edge surface of the head end of the piston rod and an inner wall of the valve cavity.

4. The acoustic module waterproof protection mechanism according to claim 1, wherein an end cross-sectional shape of a rod end of the piston rod is the same as a cross-sectional shape of the acoustic port.

5. The acoustic module waterproof protection mechanism according to claim 1, wherein a rod end of the piston rod is elastic.

6. The acoustic module waterproof protection mechanism according to claim 1, wherein the wall of the acoustic port is a smooth surface.

7. The acoustic module waterproof protection mechanism according to claim 1, wherein an inner wall of the valve cavity is a smooth surface.

8. The acoustic module waterproof protection mechanism according to claim 1, wherein the waterproof valve assembly further comprises an air passage hole provided on the inner wall of the housing and extended to the rod cavity of the valve cavity to be communicated with the rod cavity and a liquid passage hole provided on the outer wall of the housing and extended to the rod-less cavity of the valve cavity to be communicated with the rod-less cavity, and a position where the air passage hole and the valve cavity are communicated is located within a region covered by a stroke of the piston rod.

9. A wearable device comprising a housing and an acoustic module waterproof protection mechanism provided in the housing, wherein the acoustic module waterproof protection mechanism is the acoustic module waterproof protection mechanism according to claim 1.

* * * * *